(12) United States Patent
Kawamura et al.

(10) Patent No.: US 7,545,475 B2
(45) Date of Patent: Jun. 9, 2009

(54) LIQUID CRYSTAL DISPLAY DEVICE HAVING PARTICULAR INTERVAL BETWEEN SPACER GROUPS

(75) Inventors: Tetsuya Kawamura, Kyoto (JP); Katsuhiko Inada, Kumagaya (JP); Akimasa Toyama, Yokohama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 328 days.

(21) Appl. No.: 11/383,881

(22) Filed: May 17, 2006

(65) Prior Publication Data

US 2006/0285057 A1 Dec. 21, 2006

(30) Foreign Application Priority Data

Jun. 20, 2005 (JP) ............................. 2005-179328

(51) Int. Cl.
*G02F 1/1339* (2006.01)
(52) U.S. Cl. .................................... 349/155
(58) Field of Classification Search .......... 349/155–157
See application file for complete search history.

(56) References Cited

U.S. PATENT DOCUMENTS 6,181,406 B1 * 1/2001 Morimoto et al. ........... 349/155
6,724,457 B1 * 4/2004 Sunohara et al. ............ 349/155
2003/0123018 A1 * 7/2003 Kim et al. ................... 349/155
2004/0021808 A1 2/2004 Johgan et al.
2006/0256274 A1 11/2006 Johgan et al.

FOREIGN PATENT DOCUMENTS

| CN | 1475816 A | 2/2004 |
|---|---|---|
| JP | 6-281941 | 10/1994 |
| JP | 2001-125111 | 5/2001 |
| JP | 2003-121857 | 4/2003 |
| JP | 2004-46279 | 2/2004 |
| JP | 2004-61904 | 2/2004 |
| JP | 2004-239982 | 8/2004 |

* cited by examiner

*Primary Examiner*—Michael H Caley
(74) *Attorney, Agent, or Firm*—Oblon, Spivak, McClelland, Maier & Neustadt, P.C.

(57) ABSTRACT

To suppress occurrence of low temperature bubbles while securing pressure resistance to external forces applied to substrates of a liquid crystal display device, a plurality of spacers disposed between the substrates are divided into a plurality of spacer groups 2, one unit of which is configured with spacers 2a, 2b allocated in close proximity to each other; and the spacer groups 2 are disposed with a density that the low temperature bubbles do not occur. Hence, the strength of the substrates increases, and in a region 10 where no spacers exist, a large deformation of the substrates by shrinkage is allowed, and a liquid crystal layer 8 is sufficiently enough shrunk even under a low temperature environment to prevent the low temperature bubbles from occurring.

4 Claims, 8 Drawing Sheets

LIQUID CRYSTAL DISPLAY DEVICE HAVING PARTICULAR INTERVAL BETWEEN SPACER GROUPS

CROSS-REFERENCE TO RELATED APPLICATIONS

This application is based upon and claims the benefit of priority from the prior Japanese Patent Application No. 2005-179328 filed on Jun. 20, 2005; the entire contents of which are incorporated herein by reference.

BACKGROUND OF THE INVENTION

1. Field of the Invention

The present invention relates to a liquid crystal display device in which spacers and a liquid crystal layer are held between a pair of substrates that are disposed to face each other.

2. Description of the Related Art

In general, in a liquid crystal display device, a liquid crystal layer is held between a pair of substrates that are disposed to face each other. In addition, to keep a thickness of the liquid crystal layer (hereinafter, referred to as "a liquid crystal gap") to be uniform, a plurality of spacers are disposed between the substrates.

For example, in Japanese Patent Application Laid-open No. 2004-61904, a technology is disclosed in which photosensitive resin is used for a material of the spacers, and the spacers are disposed in spaces between respective pixels with an uniform density over an entire substrates by a photolithographic process. Thus, it becomes possible to prevent unevenness of a liquid crystal gap, defective of pixels, and reduction of an aperture ratio.

FIG. 1 is a plan view showing a diagrammatic constitution of a display region in a conventional liquid crystal display device. As shown in this figure, in a display region 1, one pixel is constituted by three single-color sub-pixels, that is, a red sub-pixel, a green sub-pixel, and a blue sub-pixel. In addition, columnar spacers 2a are disposed in spaces between respective pixels, with a uniform density. Reference numeral 10 in FIG. 1 denotes a region where the spacers 2a do not exist. Moreover, symbols R, G, and B in FIG. 1 denote a red sub-pixel, a green sub-pixel, and a blue sub-pixel, respectively.

FIG. 2 is a sectional view of the display region 1 taken along a line A-A in FIG. 1. As shown in this figure, on an array substrate 4, a plurality of pixel electrodes 3 are disposed, and on a counter substrate 7, a plurality of color filters 5 and a common counter electrode 6 are disposed. Between the array substrate 4 and the counter substrate 7, a liquid crystal layer 8 is held with a uniform liquid crystal gap 9, by using the spacers 2a. Although the liquid crystal display device includes, besides those described above, thin-film transistors, alignment films, polarizing plates, and the like, they are omitted in the drawing.

Incidentally, in the liquid crystal display device, the array substrate 4 and the counter substrate 7 are frequently subjected to external forces 11 denoted by arrows shown in FIG. 2 from outside.

In this case, when a density of the spacers 2a in the display region 1 of FIG. 1 is low and a spacer absent region 10 is large, the array substrate 4 and the counter substrate 7 deform beyond an elastic deformation range, and consequently, irreversible deformation occurs in the liquid crystal gap 9. Thus, an uneven display occurs on a display screen, and it becomes a significant defect in display quality for products.

On the other hand, to address such problems, a method has been proposed in which a density of spacers disposed in a display region is increased to enhance a pressure resistance to external forces which are applied to substrates, when a liquid crystal display device is designed.

However, since a thermal expansion coefficient of liquid crystals is one digit higher than those of other components, a thermal shrinkage of the liquid crystals, and those of substrates and spacer components are different to a large extent. Therefore, when a liquid crystal display device is stored or placed under a low temperature environment such as a cold region or an air cargo compartment, where, in some cases, a temperature even goes down to several tens of degrees below zero Celsius, forces work to shrink the liquid crystal gap. Especially, in a case of twisted nematic (TN) liquid crystals, forces work to shrink even several percent of the liquid crystal gap.

In the above case, when spacers are disposed with a high density, the liquid crystal gap cannot be sufficiently shrunk, and consequently, bubbles may possibly occur in the vicinities of spacers. The bubbles are supposed to contain a gas with extremely low-pressure. Hereinafter, the bubbles that could occur under environments where the temperature is lower than a normal temperature are referred to as low temperature bubbles.

There is a problem that the low temperature bubbles, which once have occurred, do not disappear in some cases even after a surrounding environment of a liquid crystal display device is put back to a normal temperature environment, and this problem becomes a cause of defect in display quality.

SUMMARY OF THE INVENTION

An object of the present invention is to secure pressure resistance to external forces applied to substrates of a liquid crystal display device and to suppress occurrence of low temperature bubbles.

A liquid crystal display device of the present invention includes a pair of substrates disposed to face each other, a liquid crystal layer held between the pair of the substrates, and an aggregate including a plurality of spacers disposed between the pair of the substrates to retain a uniform gap between the pair of the substrates. The aggregate is divided into a plurality of spacer groups, one unit of which is configured with the spacers linearly disposed in close proximity to each other, and the respective spacer groups are disposed with a density such that low temperature bubbles do not occur.

In the present invention, the plurality of the spacers are linearly disposed in close proximity to each other to become one unit of the spacer groups, and thereby strengths of the substrates are increased. Accordingly, the pressure resistance to external forces can be secured without increasing the density uniformly over an entire display region. Thus, while retaining the pressure resistance, a large area can be allocated to regions where no spacers exist, and thereby, respective spacer groups are disposed with a density low enough to prevent the low temperature bubbles from occurring. Therefore, by having a large area of the spacer absent regions, the substrates are allowed to deform to a large extent, and a liquid crystal layer is sufficiently shrunk even under the low temperature environment, so that occurrence of the low temperature bubbles can be suppressed.

As for a material of the spacers, it is preferable to use a photosensitive resin, since the spacers can be freely placed by using exposure and etching processes. In a case where a black pigment containing one is used as the photosensitive resin, a large effect can be obtained in suppressing the occurrence of the low temperature bubbles, since its elasticity coefficient is lower than that of the spacer materials used for a usual liquid crystal display device.

Moreover, in the liquid crystal display device of the present invention, one pixel is constituted by a plurality of single-color sub-pixels, and an interval between the spacers disposed in close proximity corresponds to a width of one single-color sub-pixel.

Furthermore, in the liquid crystal display device of the present invention, each of the spacer groups is away from the spacer groups neighboring in a lateral direction at intervals of not less than 5 pixels and not more than 17 pixels, and is away from the spacer groups neighboring in a vertical direction at intervals of not less than 1 pixel and not more than 4 pixels.

Furthermore, in the liquid crystal display device of the present invention, a value in which area of screen is divided by total number of the spacer groups is 120,000 square micron or more.

DESCRIPTION OF THE EMBODIMENT

First Embodiment

Figure 3:
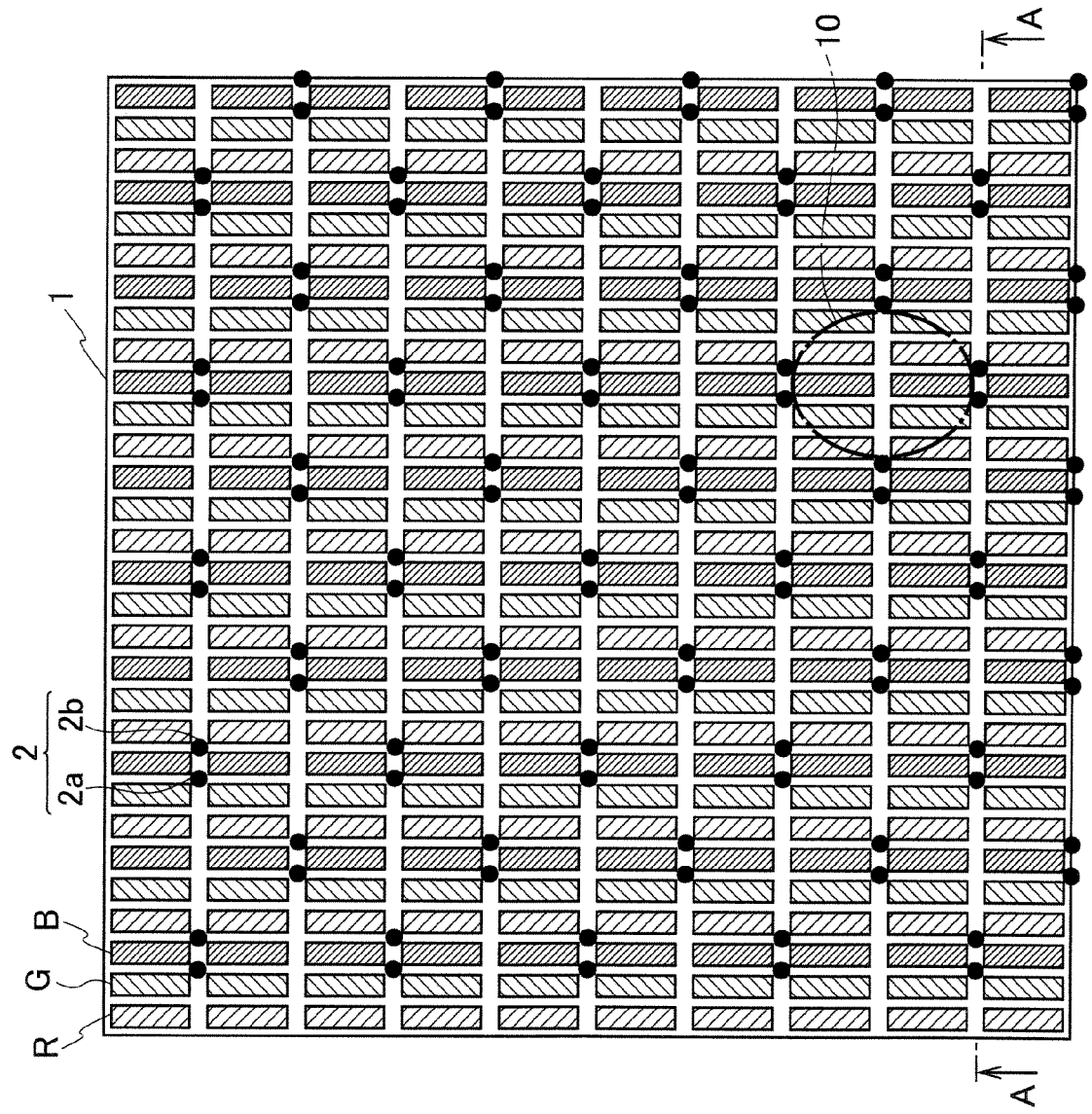
FIG. 3 is a plan view showing a diagrammatic constitution of a display region in a liquid crystal display device of a first embodiment.

FIG. 3 is a plan view showing a diagrammatic constitution of a display region in a liquid crystal display device of a first embodiment. As shown in FIG. 3, in a display region 1, one pixel is constituted by three single-color sub-pixels, that is, a red sub-pixel, a green sub-pixel, and a blue sub-pixel. Here, symbols R, G, and B denote a red sub-pixel, a green sub-pixel, and a blue sub-pixel, respectively. In the display region 1, for example, millions of pixels with about the size of 0.1 to 0.5 mm are disposed.

Respective spacer groups 2 are constituted by two spacers 2a and 2b linearly disposed in close proximity to each other, and are disposed over an entire display region 1 with such a density that low temperature bubbles do not occur. Each of the spacers 2a and 2b has a cylindrical shape, a diameter of which is about 10 μm to several tens of micrometers, and is disposed in spaces between pixels by a photolithographic process. An interval between the spacers 2a and 2b corresponds to a width of a single-color sub-pixel in a lateral direction. For a material of the spacers 2a and 2b, for example, photosensitive resin may be used since it can be freely disposed by using exposure and etching processes.

In addition, each of the spacer group 2 is away from the spacer groups neighboring in a lateral direction at intervals of 5 sub-pixels, and is away from spacer groups neighboring in a vertical direction at intervals of 2 sub-pixels. Apart from the above, to define values of the intervals between the respective spacer groups 2, experimental values are used which are obtained based on parameters such as constituting components of a liquid crystal display device which are substrates, a liquid crystal layer, spacer members and the like, an assumed temperature range, a liquid crystal gap, a pixel size, and a spacer shape. To be more precise, each spacer group 2 is away from the spacer groups neighboring in the lateral direction with intervals of not less than 5 sub-pixels and not more than 17 sub-pixels, and is away from the spacer groups neighboring in the vertical direction with intervals of not less than 1 sub-pixel and not more than 4 sub-pixels. Furthermore, a value in which area of screen is divided by total number of the spacer groups may be not less than 120,000 square micron and not more than 300,000 square micron. For example, it may be 150,000 square micron.

Figure 4:
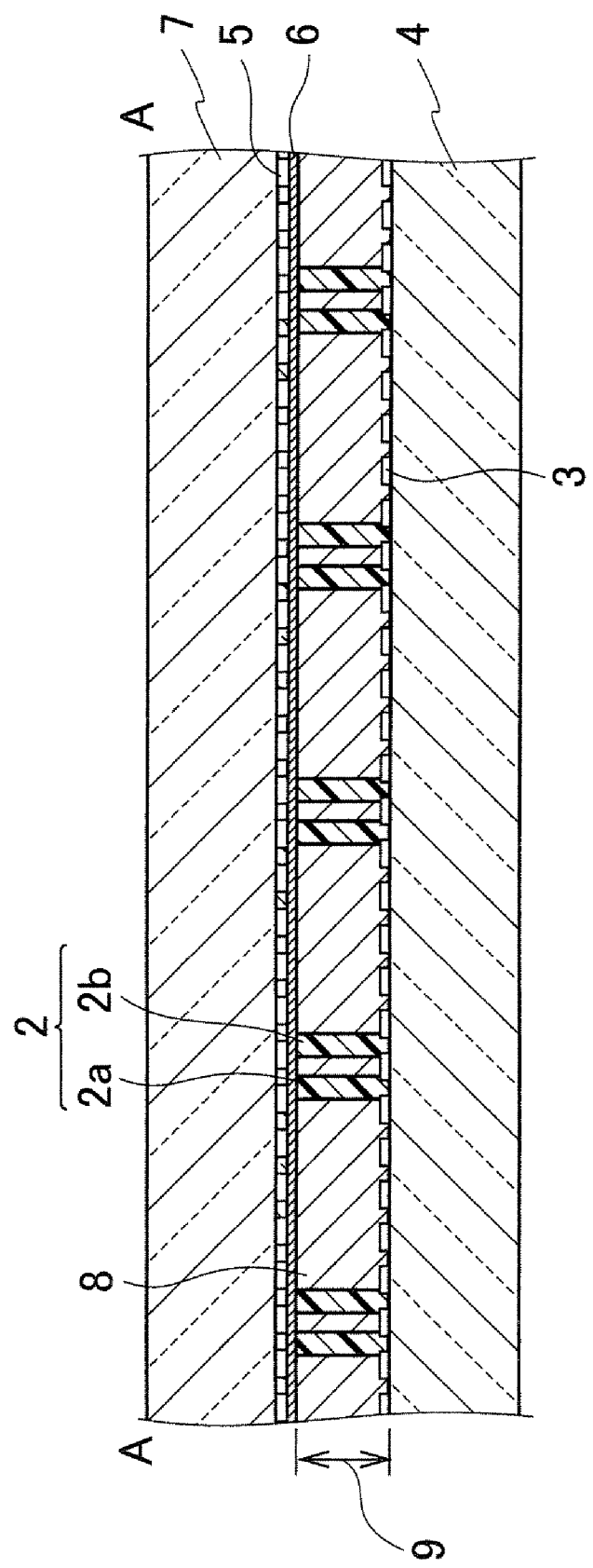
FIG. 4 is a sectional view of a display region taken along a line A-A of FIG. 3.

FIG. 4 is a sectional view of a display region 1 taken along a line A-A of FIG. 3. As shown in FIG. 4, the liquid crystal display device includes an array substrate 4, a counter substrate 7, a liquid crystal layer 8 held between both the substrates, and a plurality of spacer groups 2 disposed between both the substrates to keep a liquid crystal gap 9 between both the substrates to be uniform.

The array substrate 4 includes a plurality of pixel electrodes 3. The counter substrate 7 includes a plurality of color filters 5 and a common counter electrode 6. Each of the spacer groups 2 is constituted by the spacers 2a and 2b which are linearly disposed in close proximity to each other. Here, for the sake of simplification, descriptions of other constituting elements such as thin film transistors, alignment films, and polarizing plates are omitted.

As described above, since each of the spacer groups 2 is constituted by two spacers 2a and 2b which are disposed in close proximity to each other, strengths of the array substrate 4 and the counter substrate 7 are increased, and thus, pressure resistance to external forces applied to the substrates is enhanced.

Subsequently, functions and effects of the respective spacer groups 2 under a low temperature environment are described while comparing with a comparative example of a liquid crystal display device.

Figure 1:
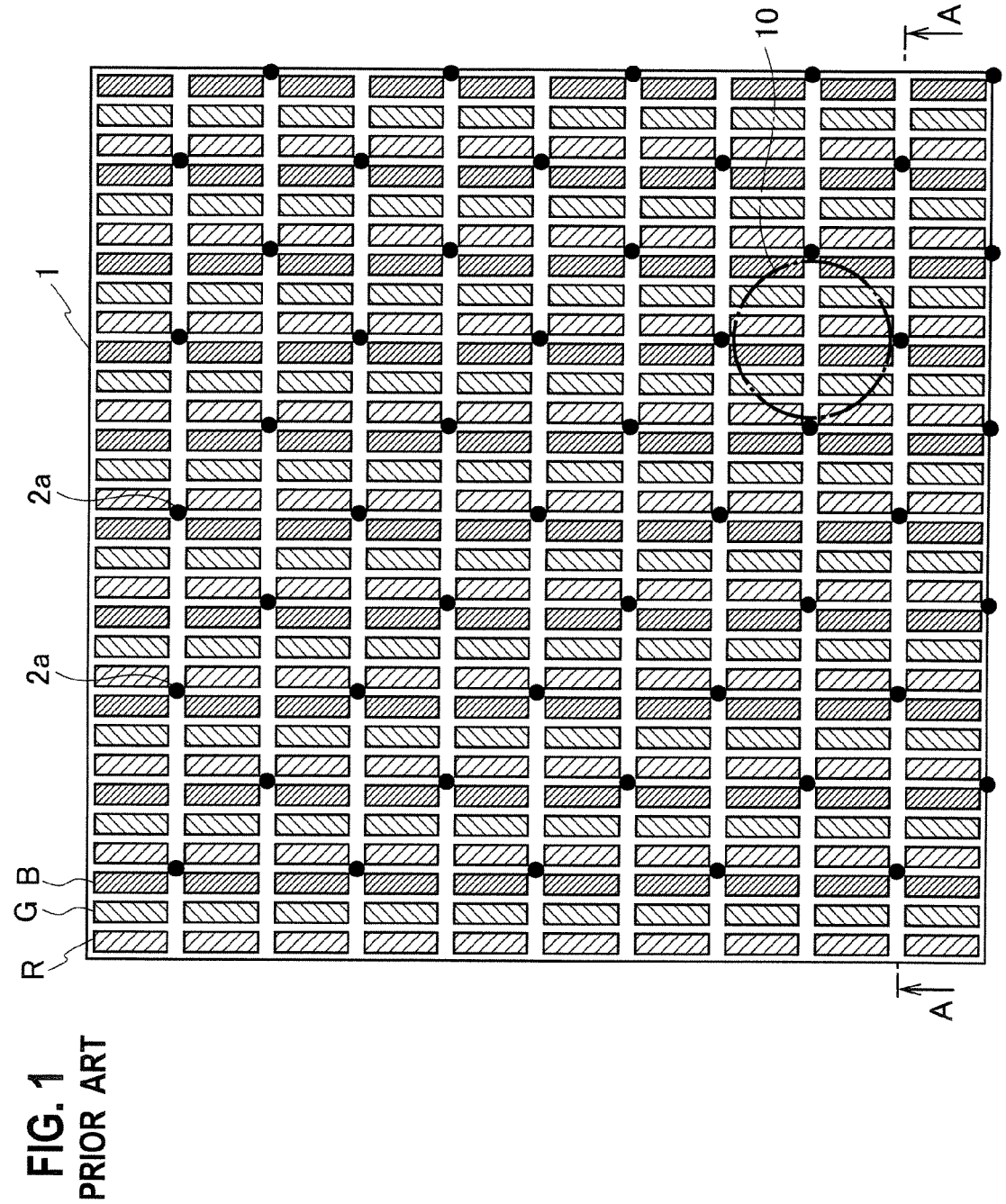
FIG. 1 is a plan view showing a diagrammatic constitution of a display region in a conventional liquid crystal display device.
Figure 5:
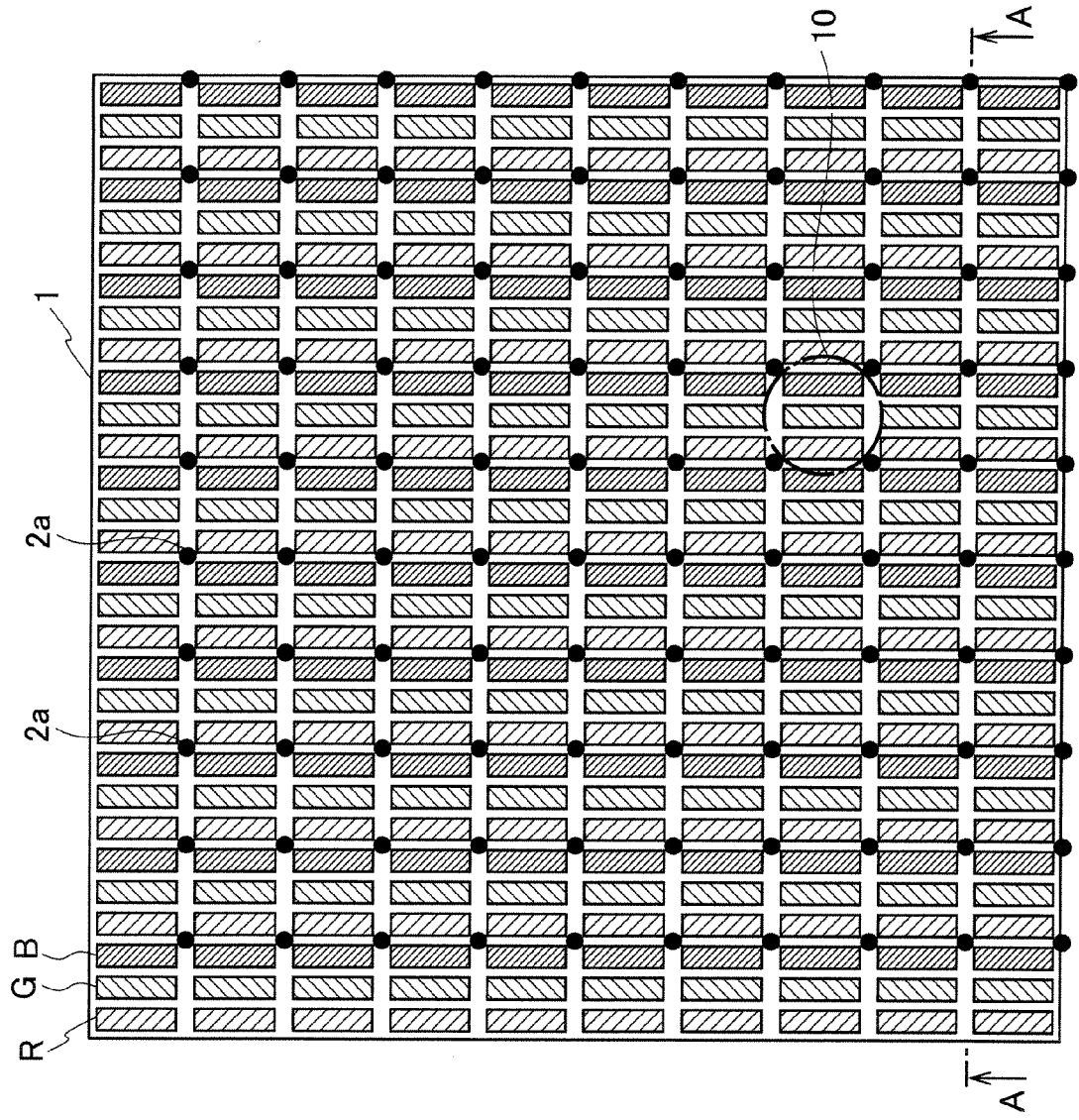
FIG. 5 is a plan view showing a diagrammatic constitution of a display region in a comparative example of a liquid crystal display device.

FIG. 5 is a plan view showing a diagrammatic constitution of a display region in the comparative example of the liquid crystal display device. The comparative example is one in which spacers are disposed in a display region with a density high enough to enhance pressure resistance to external forces applied to substrates. The FIG. 5 shows a state where with respect to the number of the spacers 2a shown as the prior art in FIG. 1, double the number of the spacers 2a are disposed in the display region 1.

Thus, by increasing the density of the spacers 2a in the display region 1, the strengths of the substrates are increased, and the pressure resistance to external forces applied to the substrates of the liquid crystal display device can be enhanced. However, in a low temperature environment such as a cold region or an air cargo compartment, components constituting a liquid crystal display device are shrunk, and consequently, forces to shrink a liquid crystal gap work.

Figure 6:
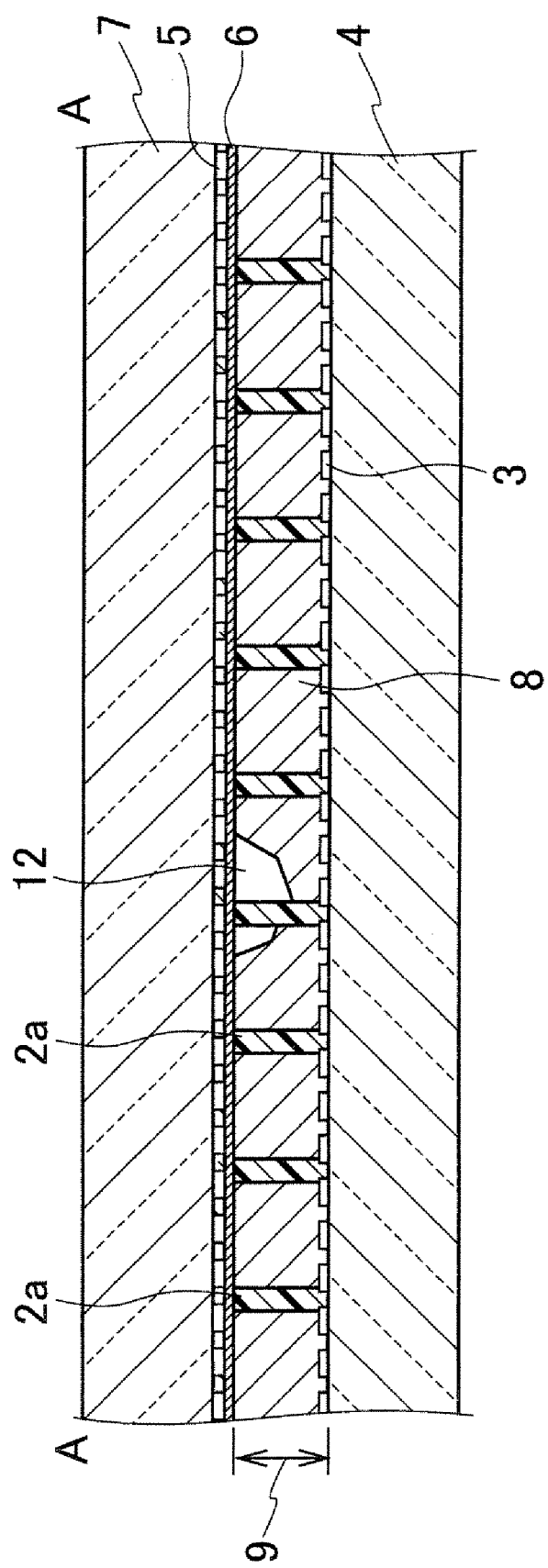
FIG. 6 is a sectional view of a display region taken along a line A-A of FIG. 5 under a low temperature environment.

FIG. 6 is a sectional view of a display region 1 taken along a line A-A of FIG. 5 under the low temperature environment. As shown in FIG. 6, in a case where the density of the spacers 2a in the display region 1 is high, and thereby, the spacer absent region 10 in FIG. 5 becomes small. Consequently, the liquid crystal gap 9 is not allowed to narrow sufficiently enough to avoid occurrence of the low temperature bubbles 12 in the vicinities of the spacers 2a.

In contrast, in this embodiment, as shown in FIG. 3, the respective spacer groups 2 are disposed with a density high enough to prevent the low temperature bubbles from occurring, and thereby, the spacers 2a and 2b absent region 10 is larger than the spacer absent region 10 shown in FIG. 5. Thus, in the spacer absent region 10 in FIG. 3, under the low temperature environment, large deformations of the array substrate 4 and the counter substrate 7 by shrinkage is allowed, and the liquid crystal layer 8 is sufficiently shrunk. Hence, the low temperature bubbles do not occur.

Therefore, according to the first embodiment, by forming one unit of a spacer group 2 by linearly disposing the plurality of spacers 2a and 2b in close proximity to each other, the strengths of the substrates are increased. Accordingly, the pressure resistance to the external forces can be secured without increasing the density of the spacers uniformly over the entire display region. Thus, while securing the pressure resistance, a large area can be allocated to the spacers 2a and 2b absent region 10, whereby the respective spacer groups 2 are disposed with a density low enough to prevent the low temperature bubbles from occurring. As described above, in the case where an area for the spacer absent region 10 is large, the substrates are allowed to deform to a large extent, and a liquid crystal layer is sufficiently shrunk even under the low temperature environment, so that occurrence of the low temperature bubbles can be suppressed.

In addition, by using a photosensitive resin for the material of spacers 2a and 2b, the spacers can be easily located on arbitrary positions by exposure and etching processes.

Furthermore, when a black pigment containing one for the light shield is used as the photosensitive resin, the occurrence of the low temperature bubbles can be more effectively suppressed, since its elasticity coefficient is lower than that of other spacer materials used for a usual liquid crystal display device.

Second Embodiment

Figure 2:
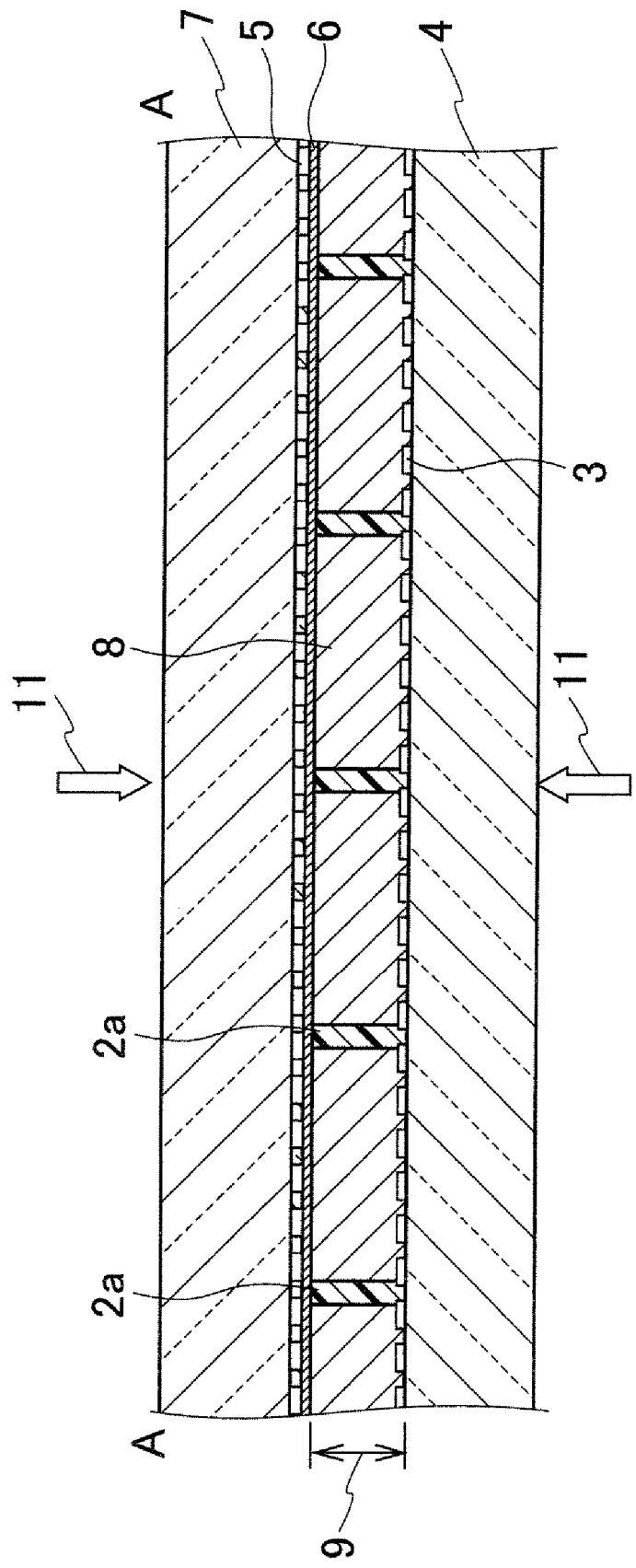
FIG. 2 is a sectional view of a display region taken along a line A-A of FIG. 1.
Figure 7:
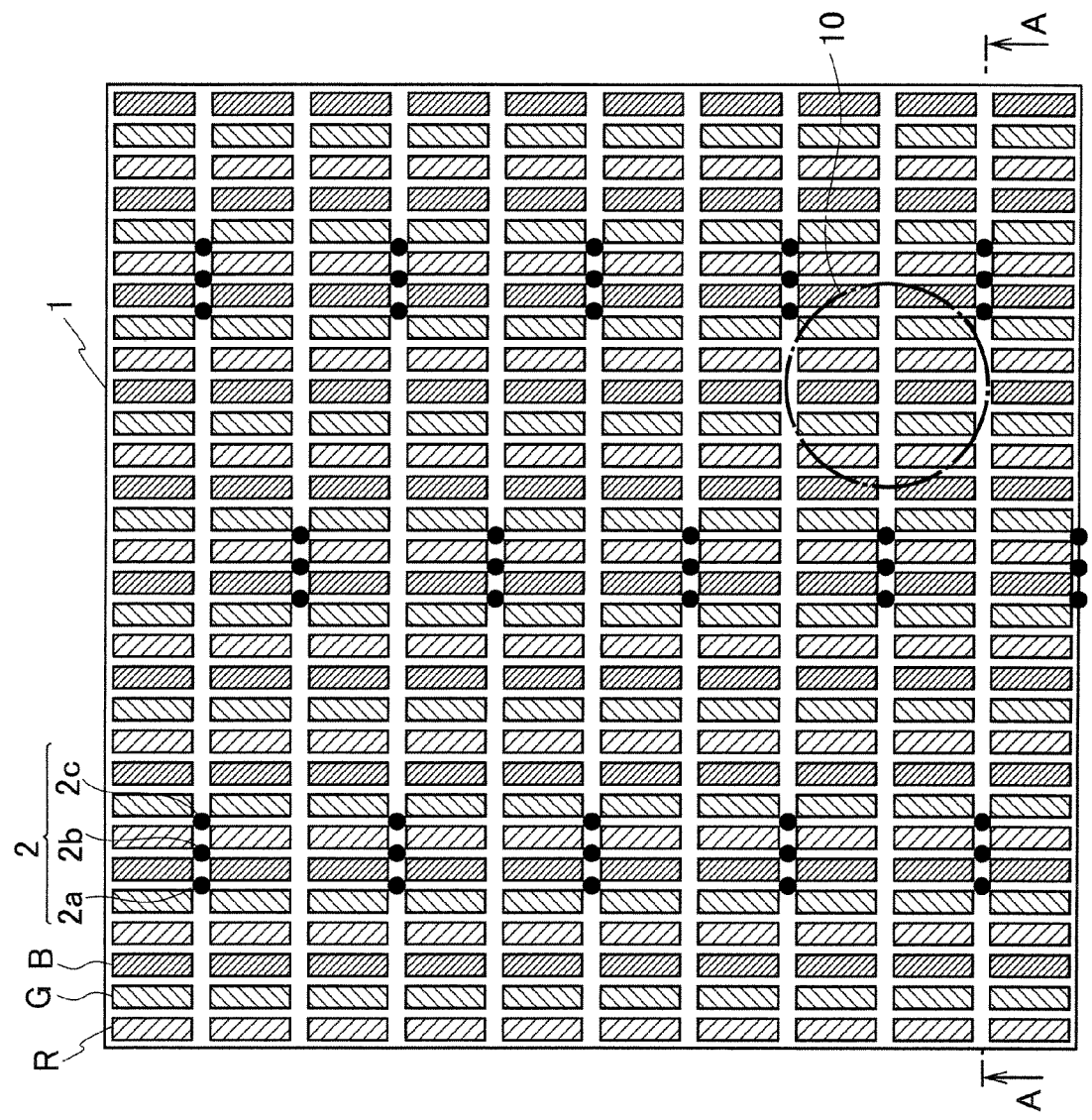
FIG. 7 is a plan view showing a diagrammatic constitution of a display region in a liquid crystal display device of a second embodiment.
Figure 8:
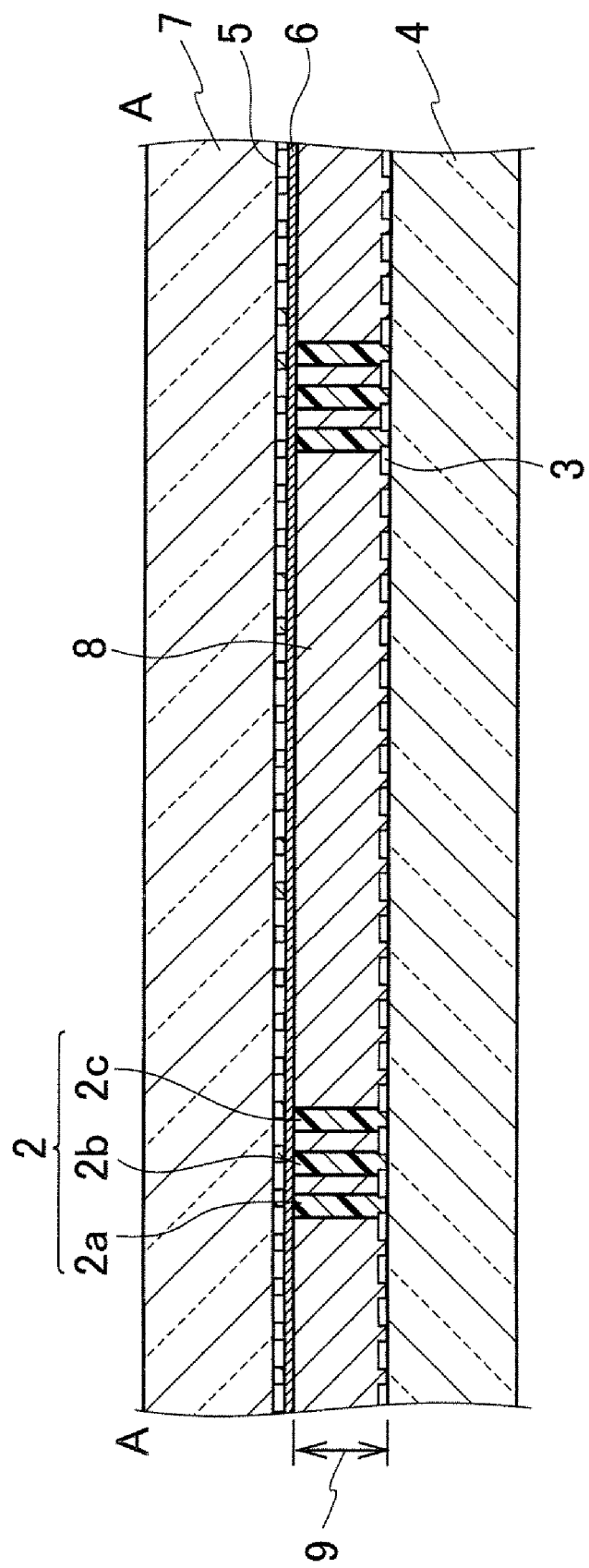
FIG. 8 is a sectional view of the display region taken along a line A-A of FIG. 7.

FIG. 7 is a plan view showing a diagrammatic constitution of a display region in a liquid crystal display device of a second embodiment. FIG. 8 is a sectional view of the display region taken along a line A-A of FIG. 7. As shown in FIGS. 7 and 8, each of spacer groups 2 is constituted by three spacers 2a, 2b, and 2c which are disposed in close proximity to each other. The spacer groups 2 are disposed over an entire display region 1 at uniform intervals with a density that the low temperature bubbles are not allowed to occur. Note that, as shown in FIGS. 7 and 8, since a fundamental constitution of the second embodiment is the same as that of the first embodiment shown in FIGS. 1 and 2, the same description is omitted, and description is provided mainly in terms of those different from the first embodiment.

The second embodiment is different from the first embodiment in that the three spacers 2a, 2b and 2c disposed in close proximity to each other constitute each of the spacer groups 2 which are allocated with a density which does not allow the low temperature bubbles to occur in the display region 1, and thereby, that the spacer absent region 10 is set to be larger. To be more precise, each spacer group 2 is away from spacer groups neighboring in a lateral direction at intervals of 16 sub-pixels, and is away from those in a vertical direction at intervals of 2 sub-pixels.

Therefore, according to the second embodiment, each spacer group 2 is constituted by three spacers 2a, 2b, and 2c which are disposed in close proximity to each other, and thereby strengths of an array substrate 4 and a counter substrate 7 are increased, so that pressure resistance to external is further increased.

In addition, since the spacer absent region 10 is set to be larger than that of the first embodiment, larger deformation of the array substrate 4 and the counter substrate 7 by shrinkage is allowed under a low temperature environment, and the liquid crystal layer 8 is sufficiently shrunk. Thereby, the occurrence of the low temperature bubbles is more effectively suppressed.

Incidentally, in the above respective embodiments, although each spacer group is constituted by two or three spacers, the number of the spacers is not limited thereto. It is possible that each spacer group is constituted, for example, by four or more spacers, or by spacers which have a large areas of cross-sections parallel to substrate surfaces, as long as the constitution is one capable of suppressing of the occurrence of the low temperature bubbles while securing pressure resistance to external force applied to substrates of a liquid crystal display device. In these cases, the same effects as those of the respective embodiments can also be obtained.

Furthermore, in the above respective embodiments, although the shape of the spacers is cylindrical, it is not limited thereto. For example, the spacer may have a truncated cone shape, a hill-like shape, a symmetric rectangular parallelepiped shape, or a wall-like shape. In these cases, the same effects as those of the respective embodiments can also be obtained.

Furthermore, the interval with spacer group to which each spacer group is horizontally adjacent need not be made equal. As well as that, the interval with spacer group to which each spacer group is vertically adjacent need not be made equal. By making the interval differ according to the position, the occurrence of irregularity in the display of originating in regular arrangement of the spacer groups can be suppressed.

What is claimed is:

1. A liquid crystal device, comprising:
   a pair of substrates disposed to face each other;
   a liquid crystal layer held between the pair of substrates; and
   an aggregate including a plurality of spacers disposed between the pair of the substrates to retain a uniform gap between the pair of the substrates,
   wherein the aggregate is divided into a plurality of spacer groups, one unit of which is configured with the spacers linearly disposed in close proximity to each other, and the respective spacer groups are disposed with a density which prevents low temperature bubbles from occurring,
   one pixel is constituted by a plurality of single-color sub-pixels, and an interval between the spacers disposed in close proximity corresponds to a width of the one sub-pixel, and
   each of the spacer groups is away from the spacer groups neighboring in a lateral direction at intervals of not less than 5 sub-pixels and not more than 17 sub-pixels, and is away from the spacer groups neighboring in a vertical direction at intervals of not less than 1 sub-pixel and not more than 4 sub-pixels.

2. The liquid crystal display device according to claim 1, wherein a photosensitive resin is used as a material for the spacers.

3. The liquid crystal display device according to claim 2, wherein the photosensitive resin contains black pigment.

4. The liquid crystal display device according to claim 1, wherein a value in which area of screen is divided by total number of the spacer groups is 120,000 square micron or more.

* * * * *